(12) United States Patent
Farchi et al.

(10) Patent No.: US 11,568,169 B2
(45) Date of Patent: Jan. 31, 2023

(54) IDENTIFYING DATA DRIFTS THAT HAVE AN ADVERSE EFFECT ON PREDICTORS

(71) Applicant: International Business Machines Corporation, Armonk, NY (US)

(72) Inventors: Eitan Farchi, Pardes Hanna (IL); Orna Raz, Haifa (IL); Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 16/396,716

(22) Filed: Apr. 28, 2019

(65) Prior Publication Data

US 2020/0342260 A1 Oct. 29, 2020

(51) Int. Cl.
*G06F 17/00* (2019.01)
*G06K 9/62* (2022.01)
*G06N 20/00* (2019.01)

(52) U.S. Cl.
CPC ......... *G06K 9/6256* (2013.01); *G06K 9/6218* (2013.01); *G06N 20/00* (2019.01)

(58) Field of Classification Search
CPC .. G06K 9/6218; G06K 9/6256; G06K 9/6268; G06N 20/00; G06V 2201/03; G06F 16/2255; G06F 16/275; G06F 16/282; G06F 16/93
USPC .......................................................... 706/12
See application file for complete search history.

(56) References Cited

U.S. PATENT DOCUMENTS

| | | | | |
|---|---|---|---|---|
| 10,878,403 | B1* | 12/2020 | Zapata-Petrov | G06Q 20/223 |
| 2016/0147860 | A1* | 5/2016 | Sample | G06F 16/2255 |
| | | | | 707/625 |
| 2016/0221591 | A1* | 8/2016 | Kuehbandner | B61L 23/04 |
| 2017/0154280 | A1* | 6/2017 | Adir | G06F 16/285 |
| 2017/0330109 | A1 | 11/2017 | Maughan et al. | |
| 2017/0372232 | A1 | 12/2017 | Maughan et al. | |
| 2018/0337878 | A1* | 11/2018 | Sathi | G06N 20/00 |
| 2019/0147469 | A1* | 5/2019 | Hu | G06F 16/353 |
| | | | | 705/7.34 |

* cited by examiner

*Primary Examiner* — Jason T Edwards
(74) *Attorney, Agent, or Firm* — Ziv Glazberg (57) ABSTRACT

A method, apparatus and product for identifying data drifts. The method comprising: obtaining a baseline dataset of instances in a feature space, each of wherein being associated with a label; determining a set of clusters in the feature space, based on the baseline dataset; determining a baseline distribution of instances over the set of clusters based on the baseline dataset; for each cluster, computing a performance metric for a predictor for the each cluster, wherein the predictor is configured to estimate an estimated label for an instance, wherein the performance metric is indicative of a successful estimation of the predictor to a portion of the baseline dataset that is comprised by the cluster; obtaining a second dataset, wherein the second dataset comprising instances in the feature space; determining a second distribution of instances over the set of clusters, wherein said determining the second distribution is based on the second dataset; and based on the second distribution and on the baseline distribution, and based on at least one performance metric of at least one the cluster of the set of clusters, identifying a data drift in the second dataset with respect to the baseline dataset.

20 Claims, 6 Drawing Sheets

| Cluster | Performance Metric | Baseline Distribution | Actual Distribution |
|---|---|---|---|
| A | 90% | 20% | 30% |
| B | 95% | 40% | 30% |
| C | 80% | 30% | 20% |
| D | 75% | 10% | 20% |

FIG. 4

IDENTIFYING DATA DRIFTS THAT HAVE AN ADVERSE EFFECT ON PREDICTORS

TECHNICAL FIELD

The present disclosure relates to machine learning in general, and to identifying degradation in the quality of the data, in particular.

BACKGROUND

Machine Learning (ML) algorithms are at the front of academic research as well as commercialized services and products. As the problem of finding a predictive model is almost solved, new problems arising. One problem is the robustness of predictive models outside the lab.

Predictive models, such as implementing Machine Learning techniques, depend on data. The predictive model may be as good as the data that was used in order to train it. If the training data provides an adequate representation of the real world data, the predictive model is likely to provide relative good predictions when used in production. Once the model is trained and is being used in order to make real predications in real life scenarios, it may encounter data that is substantially different than the data that was used in order to train the model, and as a result, it may provide unreliable predictions and generally perform below par.

BRIEF SUMMARY

One exemplary embodiment of the disclosed subject matter is a method comprising: Obtaining a baseline dataset, wherein the baseline dataset comprising a first set of instances, each instance comprising feature values in a feature space, wherein each instance of the first set of instances is associated with a label; determining a set of clusters in the feature space, based on the feature values of the first set of instances; determining a baseline distribution of instances over the set of clusters, wherein said determining the baseline distribution is based on the baseline dataset; for each cluster, computing a performance metric for a predictor for the each cluster, wherein the predictor is configured to estimate an estimated label for an instance, wherein the performance metric is indicative of a successful estimation of the predictor to a portion of the first set of instances that are comprised by the each cluster; obtaining a second dataset, wherein the second dataset comprising a second set of instances, each of which comprising feature values in the feature space; determining a second distribution of instances over the set of clusters, wherein said determining the second distribution is based on the second dataset; based on the second distribution and on the baseline distribution, and based on at least one performance metric of at least one the cluster of the set of clusters, identifying a data drift in the second dataset with respect to the baseline dataset.

Another exemplary embodiment of the disclosed subject matter is a computerized apparatus having a processor and coupled memory, the processor being adapted to perform the steps of: obtaining a baseline dataset, wherein the baseline dataset comprising a first set of instances, each instance comprising feature values in a feature space, wherein each instance of the first set of instances is associated with a label; determining a set of clusters in the feature space, based on the feature values of the first set of instances; determining a baseline distribution of instances over the set of clusters, wherein said determining the baseline distribution is based on the baseline dataset; for each cluster, computing a performance metric for a predictor for the each cluster, wherein the predictor is configured to estimate an estimated label for an instance, wherein the performance metric is indicative of a successful estimation of the predictor to a portion of the first set of instances that are comprised by the each cluster; obtaining a second dataset, wherein the second dataset comprising a second set of instances, each of which comprising feature values in the feature space; determining a second distribution of instances over the set of clusters, wherein said determining the second distribution is based on the second dataset; based on the second distribution and on the baseline distribution, and based on at least one performance metric of at least one the cluster of the set of clusters, identifying a data drift in the second dataset with respect to the baseline dataset.

Yet another exemplary embodiment of the disclosed subject matter is a non-transitory computer readable medium retaining program instructions, which program instructions when read by a processor, cause the processor to perform: Obtaining a baseline dataset, wherein the baseline dataset comprising a first set of instances, each instance comprising feature values in a feature space, wherein each instance of the first set of instances is associated with a label; determining a set of clusters in the feature space, based on the feature values of the first set of instances; determining a baseline distribution of instances over the set of clusters, wherein said determining the baseline distribution is based on the baseline dataset; for each cluster, computing a performance metric for a predictor for the each cluster, wherein the predictor is configured to estimate an estimated label for an instance, wherein the performance metric is indicative of a successful estimation of the predictor to a portion of the first set of instances that are comprised by the each cluster; obtaining a second dataset, wherein the second dataset comprising a second set of instances, each of which comprising feature values in the feature space; determining a second distribution of instances over the set of clusters, wherein said determining the second distribution is based on the second dataset; based on the second distribution and on the baseline distribution, and based on at least one performance metric of at least one the cluster of the set of clusters, identifying a data drift in the second dataset with respect to the baseline dataset.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to determine whether two datasets are statistically different. One notable example of such a problem is to determine whether a production dataset is statistically different than a baseline dataset. In some exemplary embodiments, a Machine Learning (ML) model may have been trained using training dataset and may have been tested and validated using the baseline dataset. Additionally or alternatively, once the model is in use, production dataset may be statistically different compared to the initial dataset. In some exemplary embodiments, the hardware that is being used for obtaining the production dataset may be different than the hardware that was used for obtaining the initial dataset, the data sources may have changed, or the like. As an example, a ML model may be used in order to decide, based on mammographic images, whether people have a cancer or not. During the lifetime of an X-Ray scanner, the filament may burn out, the tube may start to leak, or the like. As a result, during the lifetime of an X-Ray scanner, images taken by the X-Ray scanner may be of different. Additionally or alternatively, during the lifetime of a X-Ray scanner, there may a degradation in the quality of the scans. The different quality may cause the ML model to provide erroneous results, as it was trained using a statistically different dataset. As another example, a ML model may be trained in order to read road signs. The ML model may be in use in an area in which the road signs have faded. In case that the ML model was not trained using faded road signs, it may fail reading faded road signs.

In some exemplary embodiments, the two datasets that are being compared may be any two datasets. For clarity purposes only, the present disclosure exemplifies the disclosed subject matter using a baseline dataset and a production dataset. However, the disclosed subject matter is not limited to such an embodiment and any first and second datasets may be analyzed.

Another technical problem dealt with by the disclosed subject matter is to determine whether production dataset is statistically different than a baseline dataset, such that it may cause a predictor trained over the baseline dataset to miss-perform. As an example, a predictor may be configured to predict the height of a child based on the child's weight and current height. The predictor may be trained based on a baseline dataset obtained in the USA. The average height of a child as it manifested in the baseline dataset may be 1.6 meters. Additionally or alternatively, the predictor may be applied on a production dataset, obtained in Japan where the average height of a children is 1.5. By using the disclosed subject matter it may be possible to determine that the predictor may miss-preform, over-preform, or the like, when applied on the production dataset.

Another technical problem dealt with by the disclosed subject matter is to identify as much data drifts as possible. Additionally or alternatively, it may be desired to identify an adverse data drift as fast as possible. As an example, in case that a ML model is being used in order identifying pathologies in CT scans, it may be desired to identify as many adverse data drifts as possible in order to avoid false diagnosis.

It is noted that while the disclosed subject matter is described with relation to an identification of an adverse data drift, such disclosure is made for clarity purposes only, and without limiting the scope of the disclosed subject matter. In particular, the disclosed subject matter may be utilized to identify a data drift that is not necessarily an adverse data drift.

Yet another technical problem dealt with by the disclosed subject matter is to identify adverse data drifts in a relatively high confidence level. As an example, in case that a ML algorithm is being used in order to translate text, such as in GOOGLE TRANSLATE™, there may be a very large volume of users. In such an embodiment, and as opposed to the above CT example, the implications of not identifying an adverse data drift as fast as possible may be minor. In such an embodiment, it may be preferred to avoid false positive indications of a data drift and only report and respond to indications that have a relatively high confidence level.

One technical solution is to obtain baseline dataset. In some exemplary embodiments, the baseline dataset may comprise baseline instances. Each baseline instance may comprise feature values in a feature space. In some exemplary embodiments, the feature space may be an N dimensional space, where N is the number of features used to represent the instance. It is noted that some features may be obtained directly from the raw data, some features may be engineered features that are computed based on the raw data, or the like. Each baseline instance may be associated with a label. In some exemplary embodiments, prior to obtaining the baseline dataset, a training dataset may be obtained. Using the training dataset, a predictor may be trained in order to determine values of the features. In some exemplary embodiments, the predictor may be configured to predict a label for production instances, based on their feature values.

In some exemplary embodiments, a set of clusters in the feature space may be determined. Additionally or alternatively, the baseline instances may be arranged in an N dimensional space, and clusters may be determined in the N dimensional space. In some exemplary embodiments, the determination may be based on the values of the features of the baseline instances. In some exemplary embodiments, determining the set of clusters may be performed by algorithms such as k-mean, mean-shift clustering, agglomerative hierarchical clustering, or the like.

In some exemplary embodiments, a baseline distribution of instances over the set of clusters may be determined. The determination may be based on the on the baseline dataset. Determining the baseline distribution may comprise determining the distribution of the baseline dataset in each cluster. In some exemplary embodiments, the baseline distribution may be the expected distribution of baseline instances in the clusters and may be indicative to the actual distribution of production data over the set of clusters.

In some exemplary embodiments, a performance metric may be computed for each cluster. For each cluster, the performance metric may indicate the success ratio of the predictor when applied on instances that are comprised by the cluster. Additionally or alternatively, the performance metric may be a measurement indicating how well the predictor is capable of predicting the label of instances that are within the cluster. In some exemplary embodiments, the performance metric may be utilized as an estimated success ratio of the predictor when applied on instances in the production datasets that are comprised by the cluster.

In some exemplary embodiments, the predictor may be configured to estimate a label for instances. The instances may be instances comprised by production datasets, training datasets, testing datasets, or the like. In some exemplary embodiments, a hardware processor may be configured to execute the predictor in order to predict, to estimate, to compute, or the like, an estimated label for each instance. Additionally or alternatively, the predictor may provide a confidence level in the predicted label.

In some exemplary embodiments, a production dataset, comprising production instances, may be obtained. An actual distribution may be determined. The actual distribution may be a distribution of the production dataset over the set of clusters. In some exemplary embodiments, determining the actual distribution may comprise determining the distribution of the production dataset over each cluster. For each cluster, the distribution of production instances in the cluster may be determined. The determination may yield an actual distribution of the production instances over the clusters.

In some exemplary embodiments, based on the actual distribution and on the baseline distribution and on at least one performance metric of at least one cluster, it may be possible to identify an adverse data drift. A data drift may be a change in the distribution of the data with respect to the baseline dataset. In some exemplary embodiments, the data drift may be a statistically significant change in the distribution of the instances. An adverse data drift may a data drift that is expected to cause reduction in the predictor's ability to provide correct predictions. In some exemplary embodiments, the adverse data drift may indicate a degradation in the in the performance of the ML model utilized by the predictor.

In some exemplary embodiments, an adverse data drift may be identified when a relative ratio of a cluster having a relatively low value for the performance metric (also referred to as a poorly-predicted cluster) is increased. The relative ratio of the poorly-predicted cluster may be increased at the expense of a different cluster that is associated with a relatively high value for the performance metric. As a result, the overall performance of the model is below what was exhibited based on the baseline dataset. Additionally or alternatively, the adverse data drift may be determined based on a reduction in the performance measurement of the model. In some exemplary embodiments, a model may have a baseline performance measurement. The baseline performance measurement of the model may be determined based on the baseline distribution and on the performance metric of each cluster as exhibited in view of the baseline dataset. Each cluster may be associated with a value for the performance metric. In some exemplary embodiments, the baseline performance measurement of the model may be computed as the weighted average of the values of the performance metric of the clusters, given the distribution of instances in the clusters. The model may have an actual performance measurement. The actual performance measurement may be computed similarly to the baseline performance measurement, using the production dataset. If the actual performance measurement is lower than the baseline performance measurement, an adverse data drift may be identified. Additionally or alternatively, the adverse data drift may be identified based on a reduction that is above a predetermined threshold, such as a reduction by at least 0.5 in the absolute value of the performance measurement, a 10% reduction, or more, in the performance measurement, or the like.

Another technical solution is to determine a second set of clusters, such as using a different clustering algorithm. An adverse data drift may be identified based on an identified reduction in performance with respect to both the first set of clusters and the second set of clusters. In some exemplary embodiments, an adverse data drift may occur in case that the performance measurement is decreasing with respect to the set of clusters and that the second performance measurement is decreasing with respect to the second s set of clusters. So, confidence in the existence of the adverse data drift may be higher, compared to confidence in the existence of an adverse data drift that is determined based on a single set of clusters.

Yet another technical solution is to identify an adverse data drift based on a single set of clusters. Hence, if an adverse data drift is exhibited in either the first or in the second set of clusters, it will be identified.

One technical effect of utilizing the disclosed subject matter is to provide an automated manner indicative of a hardware malfunction that adversely affects capturing of production dataset. As an example, in case that the production dataset is a mammographic image and in case that a data drift was identified, it may be indicative that the tube may need a replacement. In some cases, the form of data drift may be indicative of the specific hardware malfunctioning. For example, if the hardware malfunction relates to receiving dark images, the data drift may be towards a specific subset of the clusters (e.g., one or more clusters, associated with dark images).

Another technical effect of utilizing the disclosed subject matter is to provide an indication to the quality of the model when production dataset is in use. In some exemplary embodiments, a predictive model may be valid with respect to the training dataset and with respect to a portion of the production dataset. However, some variation of the production dataset may not have been represented in the training dataset. Referring again to the above road signs example, identifying an adverse data drift may indicate that the signs that caused the adverse data drift may not have been adequately represented by the training dataset, the baseline dataset or the like. A remedy may be accomplished by adding data from the production dataset to the training dataset, manually providing labels thereto (or otherwise obtaining the correct labels thereof), and retraining the model.

Another technical effect of utilizing the disclosed subject matter is a method that identifies more data drifts when using one of two sets of clusters compared to a method that is using only one sets of clusters. Additionally or alternatively, using the disclosed subject matter, only adverse data drifts that are manifest in both the set of clusters and the second set of clusters are identified.

Yet another technical effect is reducing the number of false positive identifications of an adverse data drifts compared to a method that only uses one data drift. False positive indications may be an issue when manual intervention is required. In case there are many false positive indications, users may stop responding to alarms and notifications based on the indications. An increased probability of correctly identifying an adverse data drift may be useful in reducing the false positive indications and avoiding such disadvantage.

Yet another technical effect is to reduce the amount of production instances required in order to identify the adverse data drift. A fast identification using relatively small number of instances may be achieved by increasing the number of cluster sets that are being monitored and reporting an adverse data drift that is manifested in any of them.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1A:
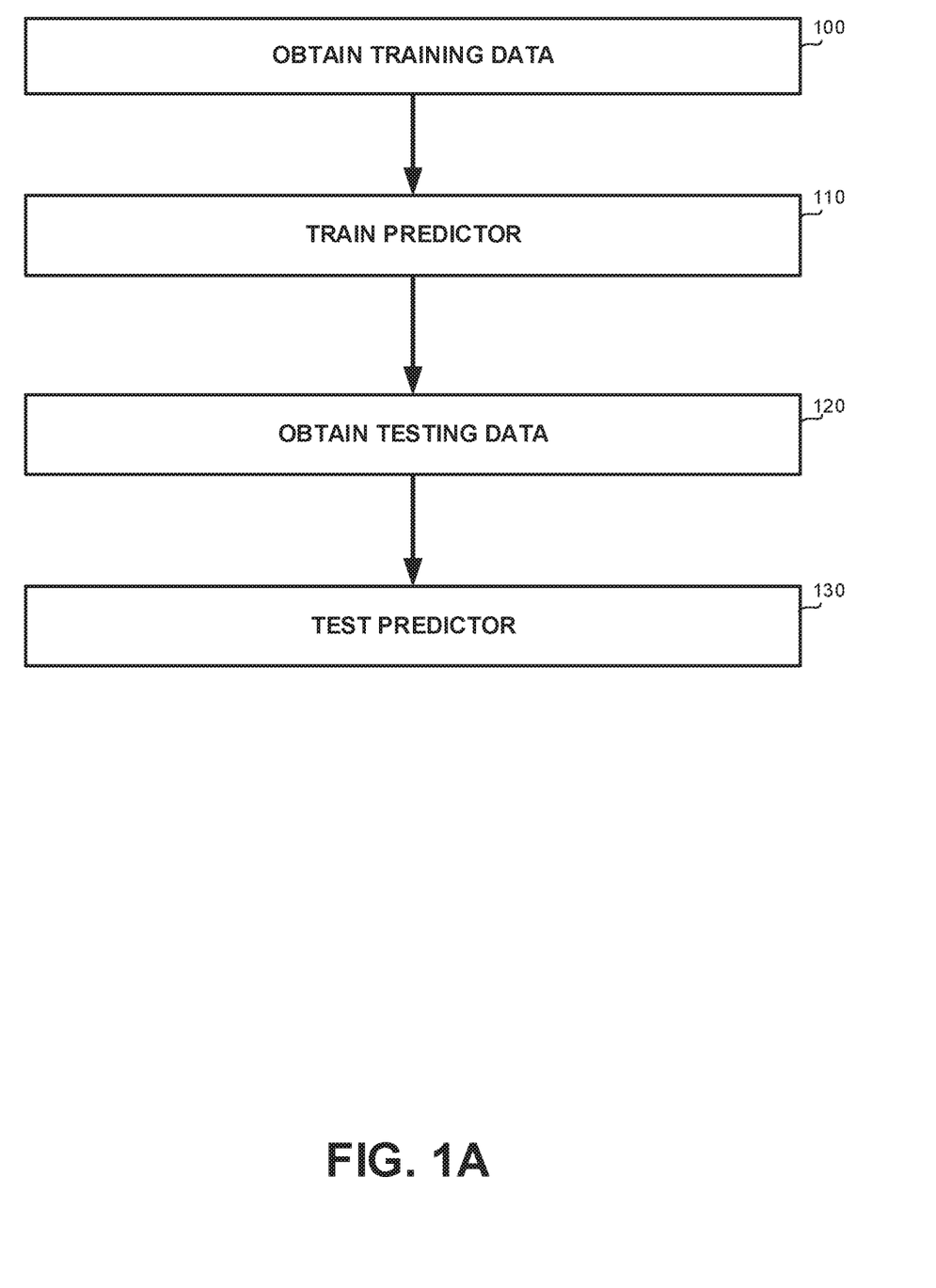
FIGS. 1A and 1B show a flowchart diagram of a method, in accordance with some exemplary embodiments of the disclosed subject matter.

Referring now to FIG. 1A showing a flowchart diagram of a method, in accordance with some exemplary embodiments of the disclosed subject matter.

On Step 100, a training dataset is obtained. The training dataset may comprise instances. Each instance may comprise features values. The feature values may be comprised in a feature space. In some exemplary embodiments, the feature space may be an N dimensional space, where N may be the number of features.

On Step 110 a predictor is trained. The predictor may be trained based on the training dataset using algorithms such as but not limited to Linear Regression, Logistic Regression, Classification and Regression Tree (CART), Naïve Bayes, K-Nearest Neighbors (KNN), Apriori, K-means, Principal Component Analysis (PCA).

On Step 120, testing dataset may be obtained. The testing dataset may be utilized as a baseline dataset. In some exemplary embodiments, the baseline dataset may be a dataset comprising instances and labels thereof that has not been used for training the predictor in Step 110. In some exemplary embodiments, the training dataset and the testing dataset may be obtained from a same source, and divided to different datasets, such as automatically, based on a desired proportion (e.g., 80:20; 50:50), or the like.

On Step 130, the predictor is tested. In some exemplary embodiments, testing the predictor may comprise applying the predictor on instances, and determining whether the predictor provided correct results. In some exemplary embodiments, the testing may be performed using the testing dataset of Step 120, and the actual labels may be compared to the predicted labels predicted by the predictor. In some exemplary embodiments, based on the success ratio in providing a correct prediction, a performance metric may be computed for the predictor.

Figure 1B:
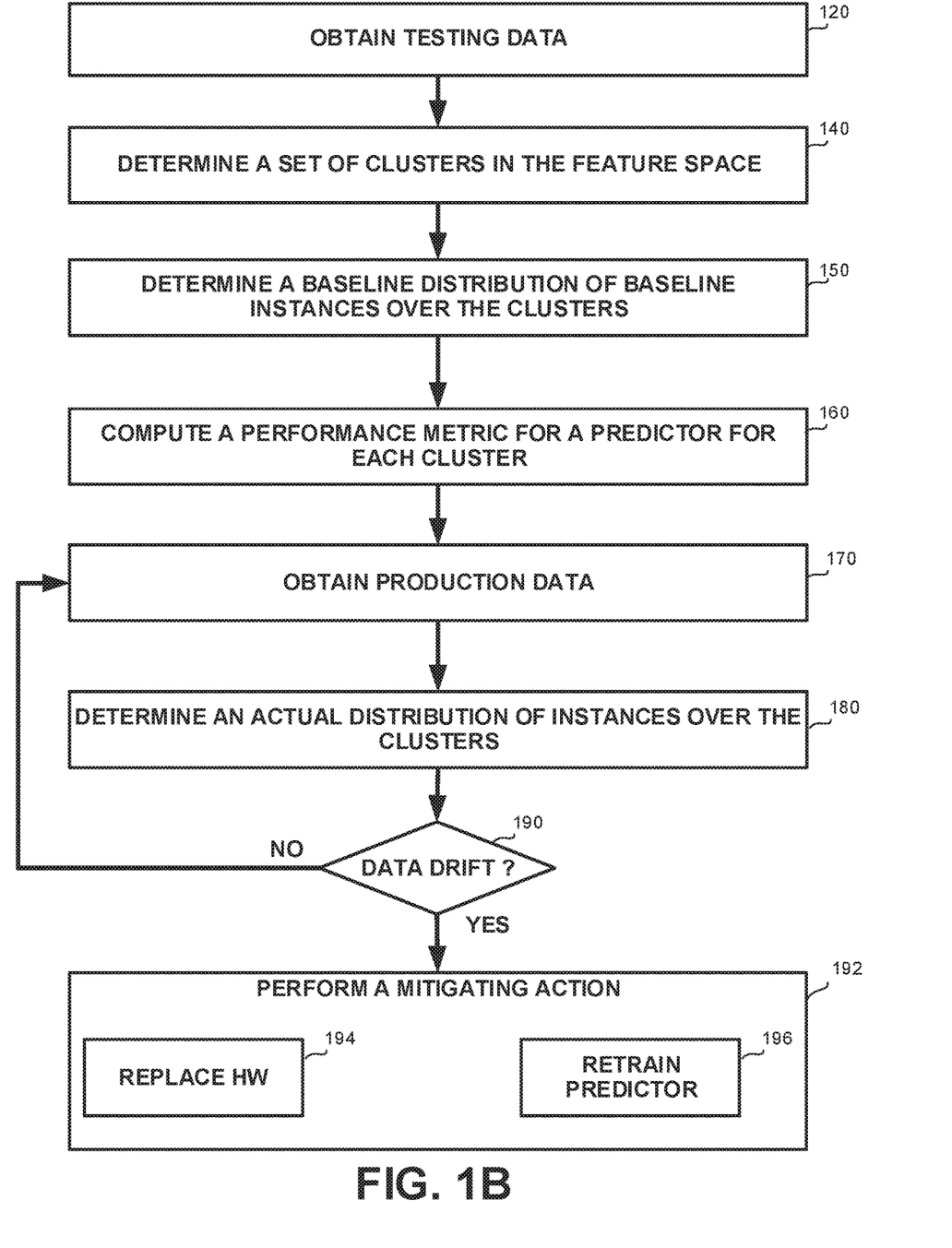

Referring now to FIG. 1B showing a flowchart diagram of a method, in accordance with some exemplary embodiments of the disclosed subject matter.

On Step 140, a set of clusters in the feature space may be determined. The set of clusters may be determined by clustering the baseline instances. In some exemplary embodiments, clustering the baseline instance to clusters in the feature space may be performed after raw data is modified and transformed into the feature space. Additionally, or alternatively, the feature space may be the learned feature space. Clustering the data based on the learned features space may imply an optimized cluster space. It is noted that a prediction may be based on a machine learning model that is also based on clustering. The clustering of Step 140 may be independent and different than clustering utilized as part of the ML technique utilized by the predictor. It may be different clustering algorithm, performed independently and separately, or the like.

On Step 150, a baseline distribution of baseline instances over the clusters may be determined. The distribution may be computed by determining, for each cluster, a portion of the baseline instances that is a member of the cluster. In some exemplary embodiments, a baseline instance may be a member of exactly one cluster. Additionally, or alternatively, a baseline instance may be a member of one or more clusters. Additionally, or alternatively, some baseline instances may not be members of any cluster. In some exemplary embodiments, the baseline distribution may be a ratio between the number of baseline instances comprised by the cluster and between the total number of baseline instances. For example, one cluster may comprise 10% of the baseline instances, a second cluster may comprise 80% of the baseline instances and a third cluster may comprise 25% of the baseline instances. As can be appreciated, in this example, the sum of the population is over 100%, due to an overlap between some clusters, as some instances are comprised by two or more clusters.

Figure 4:
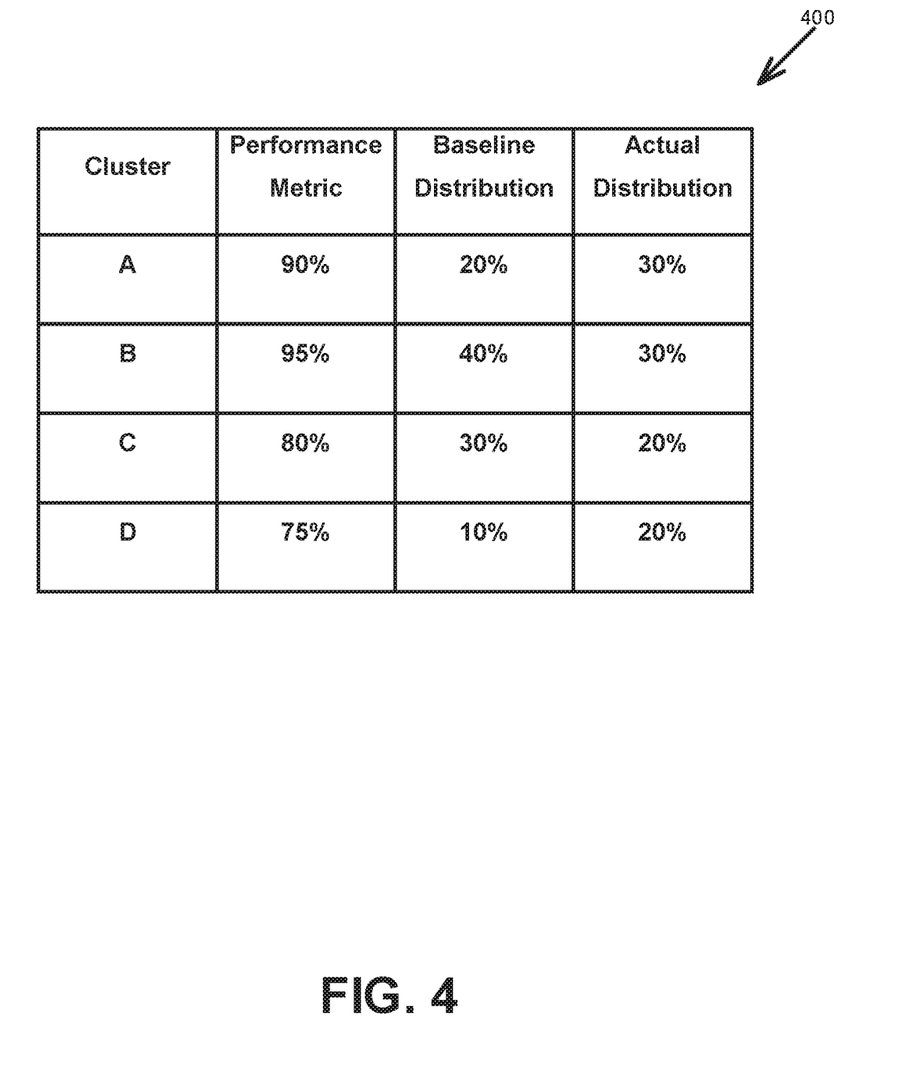
FIG. 4 shows a table, in accordance with some exemplary embodiments of the disclosed subject matter.

Table 400 in FIG. 4 illustrates an example of 4 clusters (clusters A, B, C, D). In the illustrative example, the clusters do not overlap and the comprise each of the baseline instances. The distribution of baseline instances in the clusters is 20% in cluster A, 40% in cluster B, 30% in cluster C, and 10% in cluster D.

On Step 160, for each cluster, a value for a performance metric may be determined. In some exemplary embodiments, the performance metric may be indicative of a successful estimation of labels to baseline instances comprised by the cluster. In some exemplary embodiments, the performance metric may measure how well the predictor, using its predictive model, predicts the correct label. In some exemplary embodiments, for each baseline instance in the cluster, the predictor is utilized to predict a label. The predicted label may be compared with the actual label, to determine whether the prediction is correct or not. The performance metric may be computed based on the number of instances, based on the number of instances for which a correct prediction was provided, or the like. In some exemplary embodiments, the performance metric may be, for example, an F1 score metric, an accuracy metric, a R-squared metric, a Root Mean Square Error (RSME) metric, or the like. In some exemplary embodiments, different clusters may have substantially different performance metric values. For example, the predictor may provide accurate predictions in one cluster, and tend to provide less reliable predictions in another cluster. Table 400 in FIG. 4 also illustrates the performance metric value of each cluster. In the illustrative example, the performance metric is the percentage of correct predictions in the cluster. The predictor is correct regarding 90% of the baseline instances in cluster A, regarding 95% of the baseline instances in cluster B, regarding 80% of the baseline instances in cluster C, and only regarding 75% of the baseline instances in cluster D.

Additionally, or alternatively, several different performance metrics may be utilized and a value of each may be determined. For example, F1 score metric may be used as a first performance metric and a RMSE metric may be used as a second performance metric. Both metrics may be utilized and for each cluster, a value for each metric may be computed.

On Step 170, production dataset is obtained. The production dataset may comprise production instances, each of which may comprise feature values in the feature space. The production dataset may comprise instances for which the predictor may be utilized to predict the label. The production dataset may not comprise an associated correct label for each instance.

On Step 180, an actual distribution of production instances over the clusters may be determined. In some exemplary embodiments, the actual distribution may be computed once the size of the production dataset is above a predetermined threshold. The actual distribution may be obtained as the baseline distribution is obtained on Step 150. It is noted that the actual distribution is computed with respect to the same clusters determined in Step 140, using the baseline instances.

On Step 190, it may be determined whether a data drift occurred. In some exemplary embodiments, a data drift may be identified based on a substantial change in the actual distribution (of Step 180) from the baseline distribution (of Step 150). For example, if there is a change of over a threshold number of percentage points, e.g., one percentage point, two percentage points, or the like, in the portion of any cluster, a substantial change may be identified. For example, the baseline distribution of cluster A, as shown in Table 400 of FIG. 4, changed was 20% and the actual distribution was 30%, representing a ten percentage points change. As another example, a substantial change may be a relative change of over a predetermined threshold, such as over 10%, 15%, 20%, or the like. Referring again to the example of cluster A in Table 400, the relative change from 20% to 30%, is a proportional change of 50%.

In some exemplary embodiments, an adverse data drift may be identified. In some exemplary embodiments, an adverse data drift may be a data drift that reduces the likelihood that the predictor would provide a correct prediction. In some exemplary embodiments, the predictor may be associated with a performance metric value useful for measuring the likelihood of correct prediction. An adverse data drift may be a data drift that reduces the performance metric value. In some exemplary embodiments, an adverse data drift may be identified based on an increase in a proportion of a cluster whose performance metric (as determined with respect to the baseline dataset) is relatively low. Additionally, or alternatively, an adverse data drift may be identified when the production dataset comprises a portion of over a predetermined threshold, such as over 5%, over 10%, or the like, that is not comprised by any of the clusters. Additionally, or alternatively, an estimated performance measurement for the predictor may be computed as a weighted average of the performance metric values of each of the clusters. A baseline performance measurement for the predictor may be computed using the baseline distribution. An actual performance measurement for the predictor may be computed using the actual distribution. In some exemplary embodiments, an adverse data drift may be identified if the difference between the baseline performance measurement and the actual performance measurement is positive, above a predetermined threshold, such as an absolute threshold, a relative threshold, or the like.

In some exemplary embodiments, if a data drift is identified, Step 192 may be performed. Otherwise, if no data drift was identified, Steps 170-190 may be performed again, and additional production data may be obtained and used for analysis.

On Step 192, a mitigating action may be performed. The mitigation action may be an action that is aimed at mitigating the adverse effect of the identified data drift. In some cases, the production dataset may comprise instances of low quality, and the mitigating action may be aimed at improving the quality of the instances that are obtained. For example, the hardware used to obtain the instances may be malfunctioning, degraded, worn out, or the like. In such a case, the hardware may be replaced (Step 194). Additionally, or alternatively, the mitigating action may be configured to modify the predictor so as to its ability to provide correct prediction in a dataset that is as was observed during production. In some exemplary embodiments, the predictor may be retained (Step 196).

On Step 194, the hardware that was used in order to obtain the production data may be replaced. In some exemplary embodiments, an adverse data drift may be indicative of a production data of low quality. As an example, a predictive model may be used in order to decide if a handwritten manuscript was written by Aristotle or by Plato. An adverse data drift may be indicative of a malfunctioning scanner, providing problematic images, such as too bright, too dark, or the like. As another example, a predictor may have been trained in order to diagnose cancer in X-Ray images. An adverse data drift may be indicative of a hardware malfunction that causes a disruption in the produced X-Ray images, such as, for example a leaking tube in the X-Ray scanner, a burned out filament, or the like.

On Step 196, the predictor may be retrained. In some exemplary embodiment an adverse data drift may occur despite a non-malfunction hardware. The production data that caused the data drift may be proper data. However, a portion of the production data may not have been represented in the training data. Additionally or alternatively, the production data may be different than the baseline data due to other reasons, such as a change occurring in the real-world. For example, traffic sign analysis may be trained using images of new signs. If in the real world, existing signs fade, the production dataset may differ and the predictor may perform relatively poorly. As yet another example, a law change may cause a new sign to appear. Such a sign may not have been represented in the baseline data as it did not exist at that time.

In some exemplary embodiments, the predictor may be trained using a new training data. The new training data may comprise the production data or portion thereof. The production data may be used in the new training data if correct labels thereof are obtained, such as using manual labelling, based on an external source, or the like. In some exemplary embodiments, the new training data may comprise the (old) training data, or portion thereof. In some exemplary embodiments, new training data may be obtained from other sources, irrespective of the production data. In some exemplary embodiments, the new training data may be used in order to retrain the predictor. In some exemplary embodiments, during training, it may be verified that the new training data does not exhibit a data drift with respect to the production data of Step 170, in which a data drift from the baseline data of Step 120 was identified.

Figure 2:
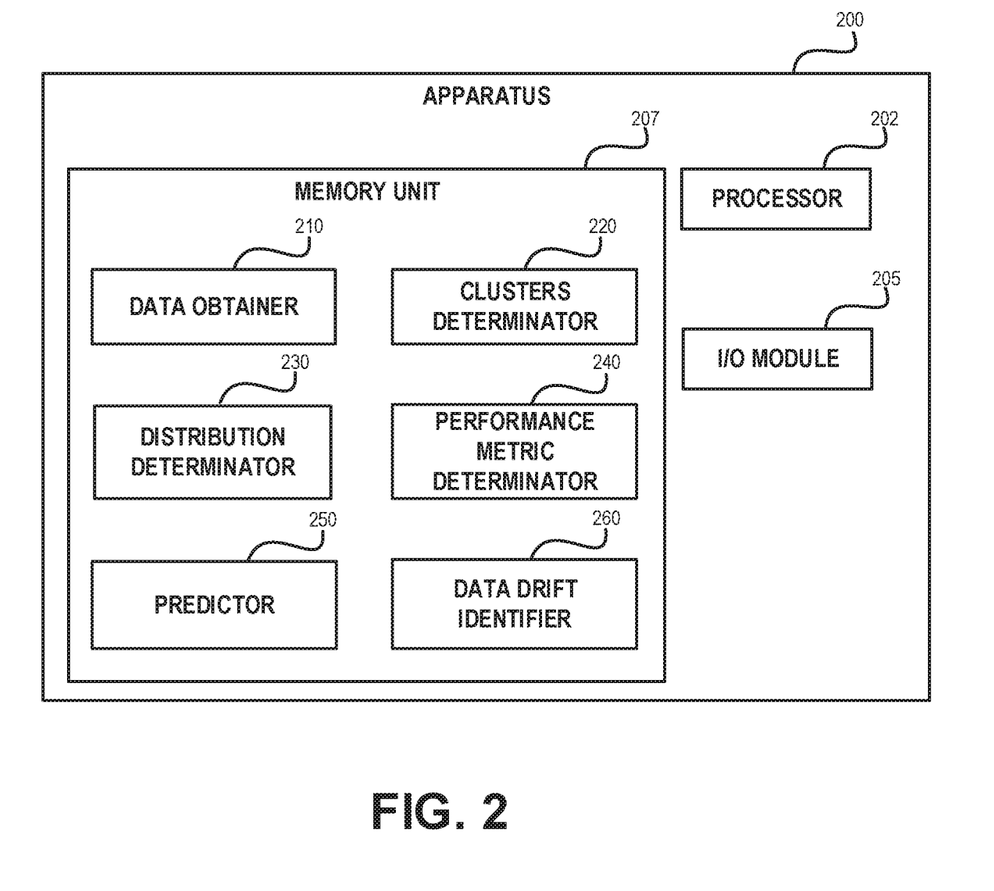
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter.

Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of its subcomponents.

In some exemplary embodiments of the disclosed subject matter, Apparatus 200 may comprise an Input/Output (I/O) Module 205. I/O Module 205 may be utilized by Data Obtainer 210 in order to obtain data such as baseline instances, production instances, or the like. Additionally or alternatively, I/O Module 205 may be utilized by Data Drift Identifier 260. In case that an adverse data drift was identified I/O Module 205 may be utilized in order to provide information. The information may be passed to a human user, indicating that the predicator may fail. In some exemplary embodiments, I/O Module 205 may be utilized to send a notification or an alert to a user. Additionally or alternatively, I/O Module 205 may be configured to invoke another automated apparatus to perform automatic maintenance activities, or the like.

In some exemplary embodiments, Apparatus 200 may comprise Memory Unit 207. Memory Unit 207 may be a hard disk drive, a Flash disk, a Random Access Memory (RAM), a memory chip, or the like. In some exemplary embodiments, Memory Unit 207 may retain program code operative to cause Processor 202 to perform acts associated with any of the subcomponents of Apparatus 200. In some exemplary embodiments, Memory Unit 207 may store outputs of other modules. Memory Unit 207 may store the clusters as were determined by Clusters Determinator 220. Additionally or alternatively, Memory Unit 207 may store the distributions as were determined by Distribution Determinator 230. Additionally or alternatively, Memory Unit 207 may store the performance metrics as were determined by Performance Metric Determinator 240.

Memory Unit 207 may comprise one or more components as detailed below, implemented as executables, libraries, static libraries, functions, or any other executable components.

In some exemplary embodiments, a Data Obtainer 210 may be configured to obtain training datasets, baseline datasets, production datasets, or the like. The datasets may be obtained from a repository such as an archive, a server, or the like. Additionally or alternatively, the datasets may be obtained using sensors such as cameras, microphones, X-RAY cameras, or the like. The data comprising the datasets may be unclassified, classified, or the like. In some exemplary embodiments, Data Obtainer 210 may obtain labeled data, such as to be used for training and testing Predictor 250, unlabeled data, such as on which Predictor 250 is used in production, or the like.

In some exemplary embodiments, Clusters Determinator 220 may be configured to determine clusters based on a dataset. Additionally, or alternatively, Cluster Determinator 220 may be configured to cluster instances in the feature space to clusters. Additionally, or alternatively, Cluster Determinator 220 may be configured to determine clusters over the baseline dataset. Additionally, or alternatively, Clusters Determinator 220 may be configured to determine clusters based on a baseline dataset. The cluster determined based on the baseline dataset may be utilized by Apparatus 200 with respect to the production dataset as well. In some exemplary embodiments, Clusters Determinator 220 may utilize algorithms such as K-Mean, Mean-Shift Clustering, Agglomerative Hierarchical Clustering, or the like. In some exemplary embodiments, Clusters Determinator 220 may determine several sets of clusters, such as using different algorithms to determine each set of clusters.

In some exemplary embodiments, Distribution Determinator 230 may be configured to determine a distribution of a dataset over the set of clusters. In some exemplary embodiments, Distribution Determinator 230 may determine a relative portion of the dataset in each cluster. In some exemplary embodiments, Distribution Determinator 230 may determine whether an instance is a member of a cluster. By enumerating over the instances, the number of members of each cluster may be calculated, and their portion of the total number of instances may be computed. In some exemplary embodiments, Distribution Determinator 230 may be configured to determine the baseline distribution over the clusters of the baseline dataset, such as determined in Step 150 of FIG. 1B. Additionally or alternatively, Distribution Determinator 230 may be configured to determine the actual distribution over the clusters of the production dataset, such as determined in Step 180 of FIG. 1B.

In some exemplary embodiments, Performance Metric Determinator 240 may be configured to compute a measurement of a performance metric of Predictor 250. In some exemplary embodiments, Performance Metric Determinator 240 may be configured to compute for each cluster, a measurement. In some exemplary embodiments, the measurement may be computed based on the difference between actual labels of instances in a cluster, and predicted labels thereof provided by Predictor 250. In some exemplary embodiments, Performance Metric Determinator 240 may be configured to compute the measurements using the baseline dataset. In some exemplary embodiments, Performance Metric Determinator 240 may utilize algorithms such as F1 score, Accuracy, R-squared, Root Mean Square Error (RSME), or the like. In some exemplary embodiments, more than one performance metric may be utilized and Performance Metric Determinator 240 may be configured to compute the measurement of each metric.

Predictor 250 may be configured to estimate a label for an instance. In some exemplary embodiments, based on the cluster to which an instance is clustered to, Predictor 250 may estimate the label of the instance. In some exemplary embodiments, Predictor 250 may comprise a predictive model that is trained using a training dataset of instances and labels thereof. In some exemplary embodiments, Predictor 250 may implement a supervised learning technique, such as but not limited to Support Vector Machines, linear regression, logistic regression, naive Bayes, linear discriminant analysis, decision trees, k-nearest neighbor algorithm, Neural Networks, Similarity learning, or the like.

In some exemplary embodiments, Data Drift Identifier 260 may be configured to identify a data drift, an adverse data drift, or the like. In some exemplary embodiments, Data Drift Identifier 260 may identify an adverse data drift based on the actual distribution, based on the baseline distribution, based on performance metric measurement of a cluster, or the like. As an example, consider a ML algorithm that is used in order to predict if an image shows a child or an adult. Clustering the baseline data set may result in two clusters: A and B. The performance metric measurement of cluster A may be 90% and the performance metric measurement of cluster B may be 95%. 40% of the baseline instances may be clustered to cluster A and 45% of the baseline instances may be clustered to cluster B. 15% of the baseline may not have been clustered. When the production dataset is obtained, an actual distribution of the production data may yield that 41% of the production instances are in cluster B. As cluster B is the mode cluster (the most common cluster), a reduction in its proportion may be indicative of a data drift. Additionally or alternatively, as cluster B is the best-performing cluster, in view of the performance metric measurements, a reduction in its proportion may be indicative of a degradation of the overall performance metric measurement of the predictor. Additionally or alternatively, when the production dataset is obtained, the actual distribution may be 60% for cluster A, and 25% for cluster B, while 15% of the production dataset is not a member of any of the clusters. As a result, an estimated weighted performance metric measurement may be about 77.75% as opposed to an original estimated weighted performance metric measurement of 78.75%. As another example, data drift may be identified if the proportion of the production dataset that is not clusters is increased from 15% to, for example, 20%, 25%, 30%, or the like. Additionally, or alternatively, an adverse data drift may be identified based on an increase in a proportion of a cluster having a relatively low performance metric measurement on the expense of a cluster having a relatively high performance metric measurement.

Figure 3A:
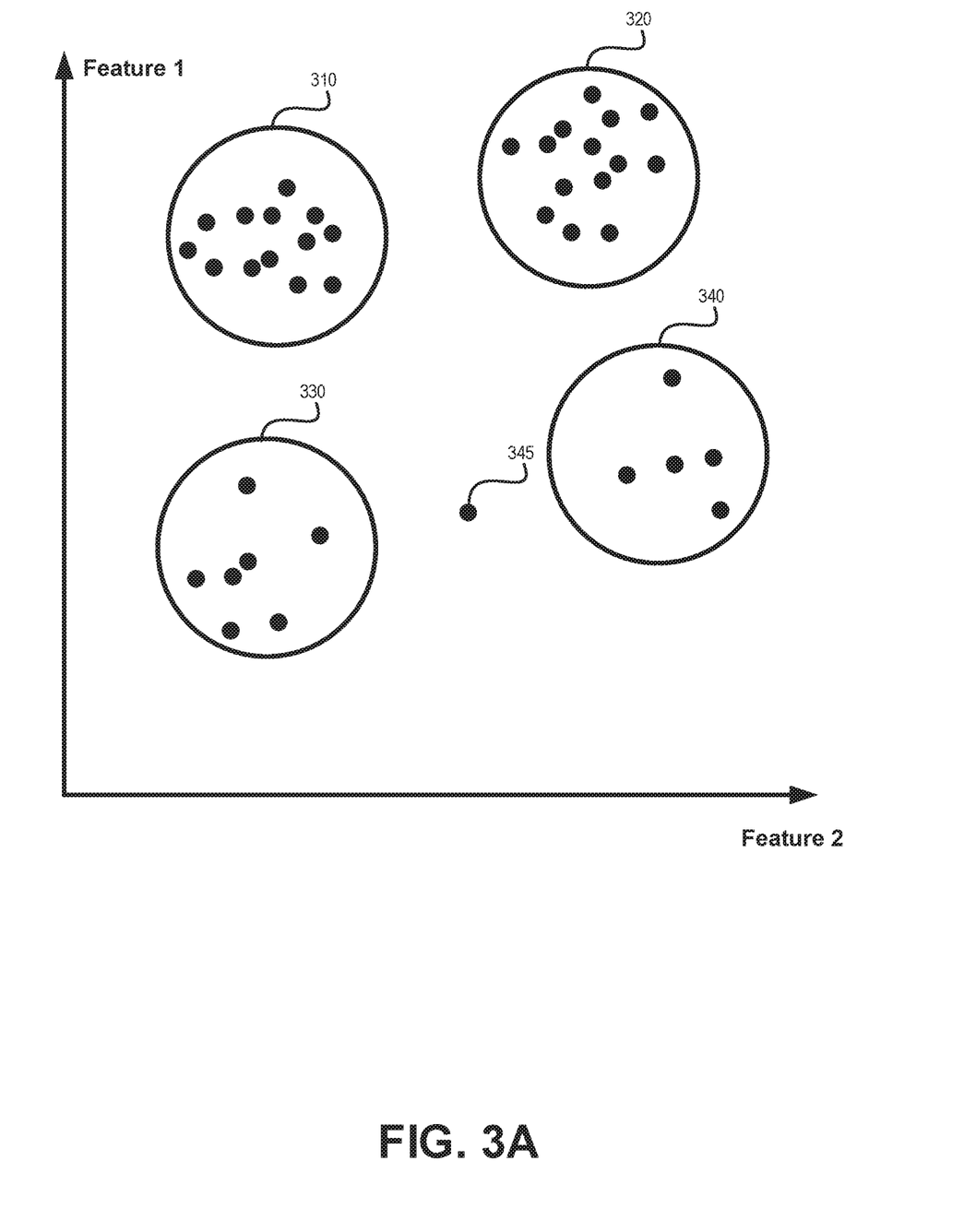
FIGS. 3A and 3B shows a schematic illustration of clustering of instances, in accordance with some exemplary embodiments of the disclosed subject matter.
Figure 3B:
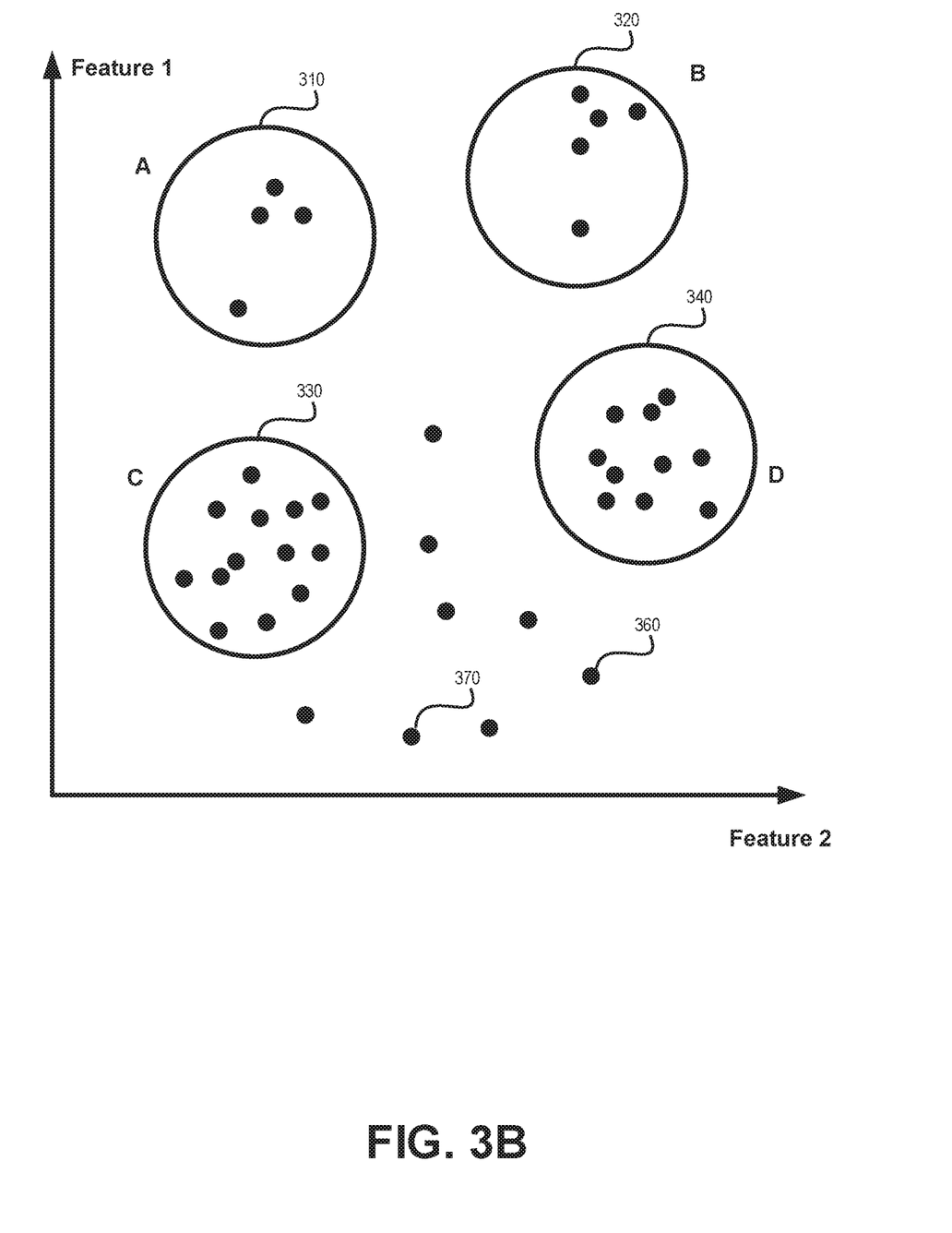

Referring now to FIGS. 3A and 3B showing an illustration of data and clusters, in accordance with some exemplary embodiments of the disclosed subject matter.

FIG. 3A shows a 2D feature space. The illustrated dots of FIG. 3A represent baseline instances. Based on the baseline instances, Cluster 310, Cluster 320, Cluster 330 and Cluster 340 are determined. Based on the membership of instances to clusters, distribution may be computed. As is exemplified by Instance 345, some instances may not be members of any clusters. In this example, there is exactly one such instance.

FIG. 3B illustrates production instances in the same 2D features space. Clusters 310, 320, 330, 340 that were determined based on the baseline dataset are used. Each instance may be a member of one or more clusters. Additionally, or alternatively, instances, such as 360, 370, may not be members of any clusters. As is exemplified by the illustration, the actual distribution of production instances is materially different than the distribution of the baseline instances, as was illustrated in FIG. 3A. In some exemplary embodiments, FIG. 3B may illustrate a data drift with respect to the baseline dataset illustrated in FIG. 3A. In some exemplary embodiments, the data drift may be an adverse data drift in view of the increase of instances that are not members of any cluster. Additionally, or alternatively, the data drift may be identified as an adverse data drift based on the performance metric measurements of the clusters.

Referring now to FIG. 4 showing a information regarding clusters, with accordance with the disclosed subject matter. Table 400 illustrates a performance metric of a predictive model. Table 400 shows information relating to 4 clusters A, B, C, D. As can be seen, 20% of the baseline instances are in cluster A, for which a performance metric measurement of 90% was computed. Similarly, cluster B comprises 40% of the baseline instances and has a performance metric measurement of 95%; cluster C comprises 30% of the baseline instances and has a performance metric measurement of 80%; and cluster D comprises 10% of the baseline instances and has a performance metric measurement of 75%. An overall performance metric measurement of the predictor may be computed based on Table 400, such as by computing a weighted average of the performance metric measurements of the clusters. In this example, with respect to the overall baseline performance metric measurement, the weighted average may be computed as 90%·20%+95%·40%+80%·30%+75%·10%=87.5%. Using the actual distribution of the clusters, as measured with respect to the production dataset, i.e., 30% for cluster A, 30% for cluster B, 20% for cluster C and 20% for cluster D, the overall actual performance metric measurement may be computed. In this example, the weighted average may be 90%·30%+95%·30%+80%·20%+75%·20%=86.5%. In some exemplary embodiments, a reduction above a predetermined threshold may be considered as an adverse data drift. For example, a reduction that is above 0.5 percentage points, may be considered as an adverse data drift. In the present example, the reduction is of 1 percentage point and therefore may be considered an adverse data drift. Additionally or alternatively, the threshold may be a relative threshold, such as a reduction of over 1%. In the present example, the reduction is of about 1.15%, and therefore may be considered as an adverse data drift. Additionally or alternatively, the adverse data drift may be determined based on a reduction in the proportion of the best-performing cluster. In this example, cluster B is the best performing cluster, and a reduction from 40% to 30% is exhibited therein. A reduction over a predetermined threshold, such as relative threshold or an absolute threshold, may be considered as an adverse data drift.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a baseline dataset, wherein the baseline dataset comprising a first set of instances, each instance comprising feature values in a feature space, wherein each instance of the first set of instances is associated with a label;
    determining a set of clusters in the feature space, based on the feature values of the first set of instances;
    determining a baseline distribution of instances over the set of clusters, wherein said determining the baseline distribution is based on the baseline dataset;
    for each cluster, computing a performance metric for a predictor for the each cluster, wherein the predictor is configured to estimate an estimated label for an instance, wherein the performance metric is indicative of a successful estimation of the predictor to a portion of the first set of instances that are comprised by the each cluster;
    obtaining a second dataset, wherein the second dataset comprising a second set of instances, each of which comprising feature values in the feature space;
    determining a second distribution of instances over the set of clusters, wherein said determining the second distribution is based on the second dataset; and
    based on the second distribution and on the baseline distribution, and based on at least one performance metric of at least one the cluster of the set of clusters, identifying a data drift in the second dataset with respect to the baseline dataset, wherein the data drift is a change in a distribution of data with respect to the baseline dataset.

2. The method of claim 1,
    wherein said obtaining the second dataset is performed using a hardware device; and
    wherein said method further comprises: in response to identifying the data drift, replacing the hardware device.

3. The method of claim 1,
    wherein the predictor is trained using a training dataset, wherein the training dataset comprises training instances and labels thereof;
    wherein said method further comprises:
    in response to identifying the data drift, determining a new training dataset, wherein the new training dataset comprises at least a portion of the second dataset, wherein each instance in the new training dataset has a corresponding label; and
    training the predictor using the new training dataset.

4. The method of claim 1,
wherein said determining the set of clusters is performed using a first clustering function;
wherein the method further comprises:
determining a second set of clusters in the feature space, based on the feature values of the first set of instances, wherein said determining the second set of clusters is performed using a second clustering function;
determining a second baseline distribution of instances over the second set of clusters, wherein said determining the second baseline distribution is based on the baseline dataset;
for each cluster in the second set of clusters, computing the performance metric for the predictor for the each cluster; and
determining a second actual distribution of instances over the second set of clusters, wherein said determining the second actual distribution is based on the second dataset.

5. The method of claim 4, wherein said identifying the data drift is further based on the second baseline distribution and based on the second actual distribution, whereby said identifying identifies data drifts that manifest in both the set of clusters and the second set of cluster, whereby potentially reducing a false positive identification rate of data drifts.

6. The method of claim 4, wherein said identifying the data drift is performed irrespective to the second set of clusters, whereby a probability that the data drift is identified is increased in comparison to identification that is based on the data drift manifesting in both the set of clusters and the second set of clusters.

7. The method of claim 1,
wherein the performance metric is selected from a group consisting of: a F1 score metric, an accuracy metric, a R-squared metric, and a Root Mean Square Error (RSME) metric.

8. The method of claim 1, wherein the baseline dataset is used for testing prediction accuracy of the predictor.

9. The method of claim 1,
wherein the second dataset is a production dataset;
wherein the predictor is trained using the baseline dataset; and
wherein the method further comprises predicting, using the predictor, a label for an instance that is comprised by the production dataset.

10. The method of claim 1, wherein said identifying the data drift is further based on a second baseline distribution and based on a second actual distribution, the second baseline distribution and the second actual distribution are determined with respect to a second set of clusters in the feature space, whereby said identifying identifies data drifts that manifest in both the set of clusters and the second set of cluster, whereby potentially reducing a false positive identification rate of data drifts.

11. The method of claim 1, wherein said identifying the data drift is performed irrespective to a second set of clusters in the feature space, the second set of clusters is determined based on the feature values of the first set of instances and using a second clustering function, whereby a probability that the data drift is identified is increased in comparison to identification that is based on the data drift manifesting in both the set of clusters and the second set of clusters.

12. A computerized apparatus having a processor and coupled memory, the processor being adapted to perform:
obtaining a baseline dataset, wherein the baseline dataset comprising a first set of instances, each instance comprising feature values in a feature space, wherein each instance of the first set of instances is associated with a label;
determining a set of clusters in the feature space, based on the feature values of the first set of instances;
determining a baseline distribution of instances over the set of clusters, wherein said determining the baseline distribution is based on the baseline dataset;
for each cluster, computing a performance metric for a predictor for the each cluster, wherein the predictor is configured to estimate an estimated label for an instance, wherein the performance metric is indicative of a successful estimation of the predictor to a portion of the first set of instances that are comprised by the each cluster;
obtaining a second dataset, wherein the second dataset comprising a second set of instances, each of which comprising feature values in the feature space;
determining a second distribution of instances over the set of clusters, wherein said determining the second distribution is based on the second dataset; and
based on the second distribution and on the baseline distribution, and based on at least one performance metric of at least one the cluster of the set of clusters, identifying a data drift in the second dataset with respect to the baseline dataset, wherein the data drift is a change in a distribution of data with respect to the baseline dataset.

13. The computerized apparatus of claim 12,
wherein said obtaining the second dataset is performed using a hardware device; and
wherein said processor being further adapted to perform: in response to identifying the data drift, replacing the hardware device.

14. A non-transitory computer readable medium retaining program instructions, which program instructions when read by a processor, cause the processor to perform:
obtaining a baseline dataset, wherein the baseline dataset comprising a first set of instances, each instance comprising feature values in a feature space, wherein each instance of the first set of instances is associated with a label;
determining a set of clusters in the feature space, based on the feature values of the first set of instances;
determining a baseline distribution of instances over the set of clusters, wherein said determining the baseline distribution is based on the baseline dataset;
for each cluster, computing a performance metric for a predictor for the each cluster, wherein the predictor is configured to estimate an estimated label for an instance, wherein the performance metric is indicative of a successful estimation of the predictor to a portion of the first set of instances that are comprised by the each cluster;
obtaining a second dataset, wherein the second dataset comprising a second set of instances, each of which comprising feature values in the feature space;
determining a second distribution of instances over the set of clusters, wherein said determining the second distribution is based on the second dataset; and
based on the second distribution and on the baseline distribution, and based on at least one performance metric of at least one the cluster of the set of clusters, identifying a data drift in the second dataset with respect to the baseline dataset, wherein the data drift is a change in a distribution of data with respect to the baseline dataset.

15. The non-transitory computer readable medium of claim 14,
- wherein said obtaining the second dataset is performed using a hardware device; and
- wherein said program instructions when read by a processor, further causes the processor to perform: in response to identifying the data drift, replacing the hardware device.

16. The non-transitory computer readable medium of claim 14,
- wherein the predictor is trained using a training dataset, wherein the training dataset comprises training instances and labels thereof;
- wherein said program instructions when read by a processor, further causes the processor to perform:
- in response to identifying the data drift, determining a new training dataset, wherein the new training dataset comprises at least a portion of the second dataset, wherein each instance in the new training dataset has a corresponding label; and
- training the predictor using the new training dataset.

17. The non-transitory computer readable medium of claim 14,
- wherein said determining the set of clusters is performed using a first clustering function;
- wherein said program instructions when read by a processor, further causes the processor to perform:
- determining a second set of clusters in the feature space, based on the feature values of the first set of instances, wherein said determining the second set of clusters is performed using a second clustering function;
- determining a second baseline distribution of instances over the second set of clusters, wherein said determining the second baseline distribution is based on the baseline dataset;
- for each cluster in the second set of clusters, computing the performance metric for the predictor for the each cluster; and
- determining a second actual distribution of instances over the second set of clusters, wherein said determining the second actual distribution is based on the second dataset.

18. The non-transitory computer readable medium of claim 17, wherein said identifying the data drift is further based on the second baseline distribution and based on the second actual distribution, whereby said identifying identifies data drifts that manifest in both the set of clusters and the second set of cluster, whereby potentially reducing a false positive identification rate of data drifts.

19. The non-transitory computer readable medium of claim 17, wherein said identifying the data drift is performed irrespective to the second set of clusters, whereby a probability that the data drift is identified is increased in comparison to identification that is based on the data drift manifesting in both the set of clusters and the second set of clusters.

20. The non-transitory computer readable medium of claim 14,
- wherein the second dataset is a production dataset;
- wherein the predictor is trained using the baseline dataset; and
- wherein said program instructions when read by a processor, further causes the processor to perform: predicting, using the predictor, a label for an instance that is comprised by the production dataset.

* * * * *